US012799717B2

(12) United States Patent
Sauer

(10) Patent No.: US 12,799,717 B2
(45) Date of Patent: Nov. 17, 2026

(54) MOBILE WORK MACHINE WITH EMERGENCY STOP FUNCTION IN CASE OF LEAKAGE IN THE WORK LINE

(71) Applicant: OILFIX GMBH, Cologne (DE)

(72) Inventor: Franz Christoph Sauer, Cologne (DE)

(73) Assignee: OILFIX GMBH, Cologne (DE)

( * ) Notice: Subject to any disclaimer, the term of this patent is extended or adjusted under 35 U.S.C. 154(b) by 0 days.

(21) Appl. No.: 19/347,930

(22) Filed: Oct. 2, 2025

(65) Prior Publication Data

US 2026/0028800 A1 Jan. 29, 2026

Related U.S. Application Data

(63) Continuation of application No. PCT/EP2023/059224, filed on Apr. 6, 2023.

(51) Int. Cl.

| | |
|---|---|
| ***E02F 9/22*** | (2006.01) |
| ***F15B 19/00*** | (2006.01) |
| ***F15B 20/00*** | (2006.01) |
| ***F15B 21/047*** | (2019.01) |
| *E02F 3/96* | (2006.01) |

(52) U.S. Cl.

CPC ............ *E02F 9/226* (2013.01); *E02F 9/2203* (2013.01); *F15B 19/005* (2013.01); *F15B 20/005* (2013.01); *F15B 21/047* (2013.01); *E02F 3/963* (2013.01)

(58) Field of Classification Search

CPC ............ E02F 9/24; E02F 9/226; F15B 20/005

See application file for complete search history.

(56) References Cited

U.S. PATENT DOCUMENTS

2013/0017074 A1 1/2013 Pahlen et al.
2016/0090997 A1 * 3/2016 Johnson ................ E02F 9/2267 137/599.11

FOREIGN PATENT DOCUMENTS

DE 202022105632 U1 * 11/2022 ............ E02F 9/2228
EP 1964756 A1 9/2008
EP 2547912 A1 1/2013
WO 2011113849 A1 9/2011

OTHER PUBLICATIONS

International Search Report in PCT/EP2023/059224, mailed Oct. 18, 2023, 2 pages.

* cited by examiner

*Primary Examiner* — Abiy Teka
(74) *Attorney, Agent, or Firm* — Keating & Bennett, LLP

(57) ABSTRACT

A mobile working machine includes a lower structure, an upper structure, a boom assembly, and a hydraulic system including a hydraulic pump, a work line, a hydraulic consumer, a volume control valve to regulate hydraulic fluid flow in the work line connected to the consumer in order to control the consumer, and a bypass to bypass the volume control valve. An anti-cavitation device with a replenishment function is provided in the bypass such that when a pressure in the work line is greater than a predetermined pressure, the bypass is closed, and when the pressure in the work line is equal to or less than the predetermined pressure, the bypass is open and the work line or the hydraulic consumer connected to the work line can suck in hydraulic fluid via a supply line. The anti-cavitation device includes an emergency stop function or device to close the line in the bypass or the supply line when a leak is detected in the work line.

11 Claims, 3 Drawing Sheets

MOBILE WORK MACHINE WITH EMERGENCY STOP FUNCTION IN CASE OF LEAKAGE IN THE WORK LINE

CROSS REFERENCE TO RELATED APPLICATIONS

This application is a Continuation Application of PCT Application No. PCT/EP2023/059224 filed on Apr. 6, 2023. The entire contents of this application are hereby incorporated herein by reference.

BACKGROUND OF THE INVENTION

1. Field of the Invention

The present invention relates to mobile work machines, methods of using mobile work machines, and methods for reducing or minimizing hydraulic fluid loss in mobile work machines in the event of a leak in a work line.

2. Description of the Related Art

Mobile work machines with hydraulic systems, in particular, mobile hydraulic work machines such as construction machines, are used in a variety of ways on construction sites for demolition and dismantling work. However, such mobile work machines are also used in civil engineering and forestry. Examples of mobile work machines include cranes, excavators, such as material handlers, as well as forestry machines and the like. In the demolition sector, so-called long-arm excavators (longfront) or demolition excavators are used, among others. The long booms and arms make mobile hydraulic construction machines a good tool for using hydraulic attachments for the respective purpose even at heights of over 20 m. When operating mobile hydraulic construction machines, the hydraulic hoses of the hydraulic system of the attachments or the hydraulic cylinders on the boom are exposed to external influences such as aging processes or weather conditions, which can cause damage to the hydraulic hoses. However, other and much more unpredictable sources of damage are mechanical impacts on the hydraulic hoses from outside when working in areas that are not entirely visible. The excavator operator cannot see every part of the boom of the mobile hydraulic construction machine during operation, so hydraulic hoses can get caught on sharp objects on the construction site, for example, and be punctured, torn off, cut open, crushed, and thus damaged. Due to unavoidable aging processes on the one hand and unpredictable external influences on the other hand, hydraulic fluid leaks may occur in the hydraulic hoses during normal operation of the mobile machine. It is known from EP 25 47 912, among others, to interrupt lines of the hydraulic system at the attachment that have been damaged by pipe breaks so that the attachment does not perform any uncontrolled movements, remains in a rigid position, and does not pose any safety risks on the construction site. However, in this case, the hydraulic system is only interrupted on the side of the attachment, which is critical because the long booms and arms of mobile hydraulic construction machines also require long hydraulic lines that must be routed to the end of the arm to the attachment, so that in the event of an hydraulic fluid leak, often more than 400 liters of hydraulic fluid can escape in less than half a minute and hit the ground at the construction site. The loss of hydraulic fluid, which is often very hot, not only means additional costs for replacing the lost hydraulic fluid, but also significant environmental pollution of the construction site and often a considerable risk to people.

The same applies to the use of harvesters in forestry, some of which are including long arms carrying grapples for gripping tree trunks, which, in addition to the hydraulic unit for the grapple, also include a hydraulic motor for rotating the grapple.

SUMMARY OF THE INVENTION

Example embodiments of the present invention provide mobile work machines in which hydraulic systems reduce or minimize hydraulic fluid loss in the event of a leak in a work line, and also provide valves or shut-off devices in mobile work machines, and methods for reducing or minimizing hydraulic fluid loss in mobile work machines in the event of a leak in a work line.

That is, example embodiments of the present invention provide mobile work machines, methods of using mobile work machines, and methods of reducing or minimizing hydraulic fluid loss in mobile work machines in the event of a leak in a work line.

Accordingly, a mobile work machine according to an example embodiment of the present invention includes a lower structure, an upper structure, a boom assembly, and a hydraulic system including a hydraulic pump, a work line, a hydraulic consumer, a volume control valve to regulate hydraulic fluid flow in the work line connected to the hydraulic consumer to control the hydraulic consumer, and a bypass to bypass the volume control valve, wherein an anti-cavitation device with a replenishment function or device or suction function or device is provided such that when a pressure in the work line is greater than a predetermined pressure, the bypass is closed, and when the pressure in the work line is equal to or less than the predetermined pressure, the bypass is open and the work line or the hydraulic consumer connected to the work line is configured to supply or suck hydraulic fluid via a supply line. The suction function or device includes an emergency stop function or device, each of which is designed to close a line in the bypass or the supply line when a leak is detected in the work line. “Supplying” means that hydraulic fluid flows through the supply line. This can be done, for example, by suction or due to dynamic pressure. The boom assembly may include two or more links, in particular a single boom. Preferably, the boom assembly includes a boom and an arm that can carry an attachment, such as a hydraulic attachment.

The emergency stop function or emergency stop device ensures that even a blinded (shut-off) work line is no longer supplied with hydraulic fluid and that the escape of hydraulic fluid is prevented, even if the hydraulic pump of the work machine continues to deliver hydraulic fluid. Damage to the hydraulic pump due to running dry can thus be prevented. In addition, the method achieves occupational safety and resource conservation in that hydraulic fluid can be saved. All other functions of the mobile work machine, in particular, an excavator, remain available. The work machine does not have to be completely shut down. This results in major advantages.

The emergency that leads to a shutdown or emergency stop may be a leak in a work line as described above, such as a break in at least one flexible hose bend, especially in the immediate vicinity of a tool mounted on the boom assembly or in the immediate vicinity of a hydraulic working cylinder of the boom assembly.

Preferably, the hydraulic consumer is a hydraulic cylinder to cause movement of the boom assembly and/or a hydraulic-fluid attachment. The hydraulic cylinder can be, for example, the arm cylinder, bucket cylinder, boom cylinder, intermediate boom cylinder, or the hydraulic unit of an attachment. In particular, the hydraulic unit of an attachment is a hydraulic-fluid tool, for example, an excavator tool, a demolition shear, a forestry tool, or a civil engineering tool. With these tools and their usual area of application, there is a particularly high risk of line breakage as a result of damage during operation. The emergency stop function described above is particularly advantageous if the frame is self-driven.

The hydraulic cylinder can be single-acting or double-acting. The volume control valve can be a 4/3-way proportional valve. It preferably includes four connections. In a double-acting hydraulic cylinder, a first connection is connected to a first work line, which is connected to a first chamber of the hydraulic cylinder. A second connection is connected to a second work line, which is connected to the second chamber of the hydraulic cylinder. The third connection is connected to a pressure line originating from the hydraulic pump and the fourth connection is connected to a tank line to the tank. A (primary) pressure relief valve may be provided between the tank line and the pressure line.

It is advantageous if a pressure relief valve positioned parallel or substantially parallel to the anti-cavitation device is provided in the bypass, or if the anti-cavitation device has a (secondary) pressure relief function.

In an advantageous example embodiment, the bypass includes a branch from a tank line and the supply line is the tank line. Hydraulic fluid can thus flow from the tank into the work line via the bypass.

An advantageous location for an emergency stop device is in the bypass between a branch from the work line (in which the anti-cavitation device is located) and a branch connected to a line in which the pressure relief valve is located. The pressure relief valve then remains active even when the bypass is shut off in the event of leakage, protecting the mobile machine from damage. A particularly preferred location is between the anti-cavitation device and the branch connected to the line in which the pressure relief valve is located.

Preferably, the emergency stop device or the anti-cavitation device including an emergency stop function is switchable back and forth between a closed state and an open state.

It is conceivable that the anti-cavitation device including an emergency stop function includes a check valve that can be closed manually, electrically, hydraulically, and/or pneumatically.

Preferably, a controller is configured or programmed to control the volume control valve and the controller is connected to the emergency stop device and/or the anti-cavitation device in order to activate the emergency stop device and/or the anti-cavitation device to close the line when a leak is detected in the work line.

The hydraulic system may include a pressure sensor and/or a hydraulic circuit to detect a leak in the work line. It is also possible that the leak is detected also or only by an operator of the mobile work machine and that a signal is transmitted to the controller by actuating an emergency stop (emergency stop switch/controller). Preferably, an emergency stop device is located in the driver's cabin of the mobile hydraulic machine. If the driver of the mobile hydraulic (construction) machine detects a leak, the driver can actuate the emergency stop device and thus prevent the hydraulic fluid from continuing to leak at the point of rupture.

In an example embodiment, the mobile machine is a hydraulic construction machine, in particular, a long-arm excavator, which has a reach height in the range of about 15 m to about 90 m and, in particular, a weight class between about 25 t and about 400 t, for example. However, the hydraulic construction machine can also be a mini excavator up to about 10 t or a small excavator up to about 18 t, for example.

Furthermore, another example embodiment of the present invention provides a method of using a valve or a shut-off device in a mobile work machine including a lower structure, an upper structure, a boom assembly, and a hydraulic system including a hydraulic pump, a work line, a hydraulic consumer, a volume control valve to regulate hydraulic fluid flow in the work line connected to the hydraulic consumer to control the hydraulic consumer, and a bypass to bypass the volume control valve, wherein an anti-cavitation device with a replenishment function or device or suction function or device is provided such that when a pressure in the work line is greater than a predetermined pressure, the bypass is closed, and when the pressure in the work line is equal to or less than the predetermined pressure, the bypass is open and the work line or the hydraulic consumer connected to the work line is configured to supply or suck hydraulic fluid via a supply line, wherein the method includes, when a leak is detected in the work line, shutting off the line in the bypass or the supply line to shut off a volume flow of hydraulic fluid in a direction of the work line.

The hydraulic system can be designed as described above.

In addition, according to another example embodiment of the present invention, a method for reducing or minimizing hydraulic fluid loss in a mobile work machine according to one of the example embodiments of the present invention described above, in response to a leak in a work line, includes at least one of moving or holding at least one of a volume control valve in a shut-off position to shut off the work line to a pressure line connected to the hydraulic pump, and shutting off the bypass or the supply line to prevent the hydraulic fluid from entering the work line via the bypass.

The above described steps can be performed at approximately the same time or one after the other. The method is particularly reliable and easy to control in an emergency. The mobile work machine can be designed as described above.

The method preferably includes, after repairing the leak, releasing the volume control valve and opening the bypass or supply line so that hydraulic fluid can enter the work line via the bypass when there is lower pressure in the work line.

This has the advantage that the original leak-free state can be restored, in particular without the need for tools and/or without having to replace cartridges, for example. The emergency stop function can be deactivated again, for example, by pressing the emergency switch again after the leak has been repaired. However, it is also possible for the valves or shut-off devices to be automatically controlled by a sensor that detects a drop in pressure, or for the valves or shut-off devices to close hydraulically in a fully automatic manner when the pressure drops.

Preferably, the method further includes shutting off a second bypass to bypass the volume control valve, wherein an anti-cavitation device with a replenishment function is provided in the second bypass in such a way that when a pressure in a second work line associated with the hydraulic consumer is greater than a predetermined pressure, the second bypass is closed, and when the pressure in the second work line is equal to or less than the predetermined pressure, the second bypass is open and the second work line or the hydraulic consumer connected to the second work line is configured to suck in hydraulic fluid via the supply line, or shutting off the supply line, such that the shut-off is also performed when the second work line is leak-free in order to prevent hydraulic fluid from escaping from the first work line.

It is conceivable to shut off the supply line in such a way that neither bypass can replenish or suck in additional fluid. The volume control valve preferably has a state in which both work lines are blinded and the pressure line is connected to the tank line. The hydraulic cylinder is preferably double-acting and each work line is connected to a chamber.

It is also conceivable to provide the emergency stop devices and/or the anti-cavitation devices with an emergency stop function such that the two components assigned to a single hydraulic consumer are connected to each other hydraulically and/or electrically, so that in the event of a leak, both bypasses can be shut off particularly easily.

Example embodiments of the present invention are explained in more detail below with reference to the drawings. Identical or functionally identical components are designated by the same reference numerals in the figures.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
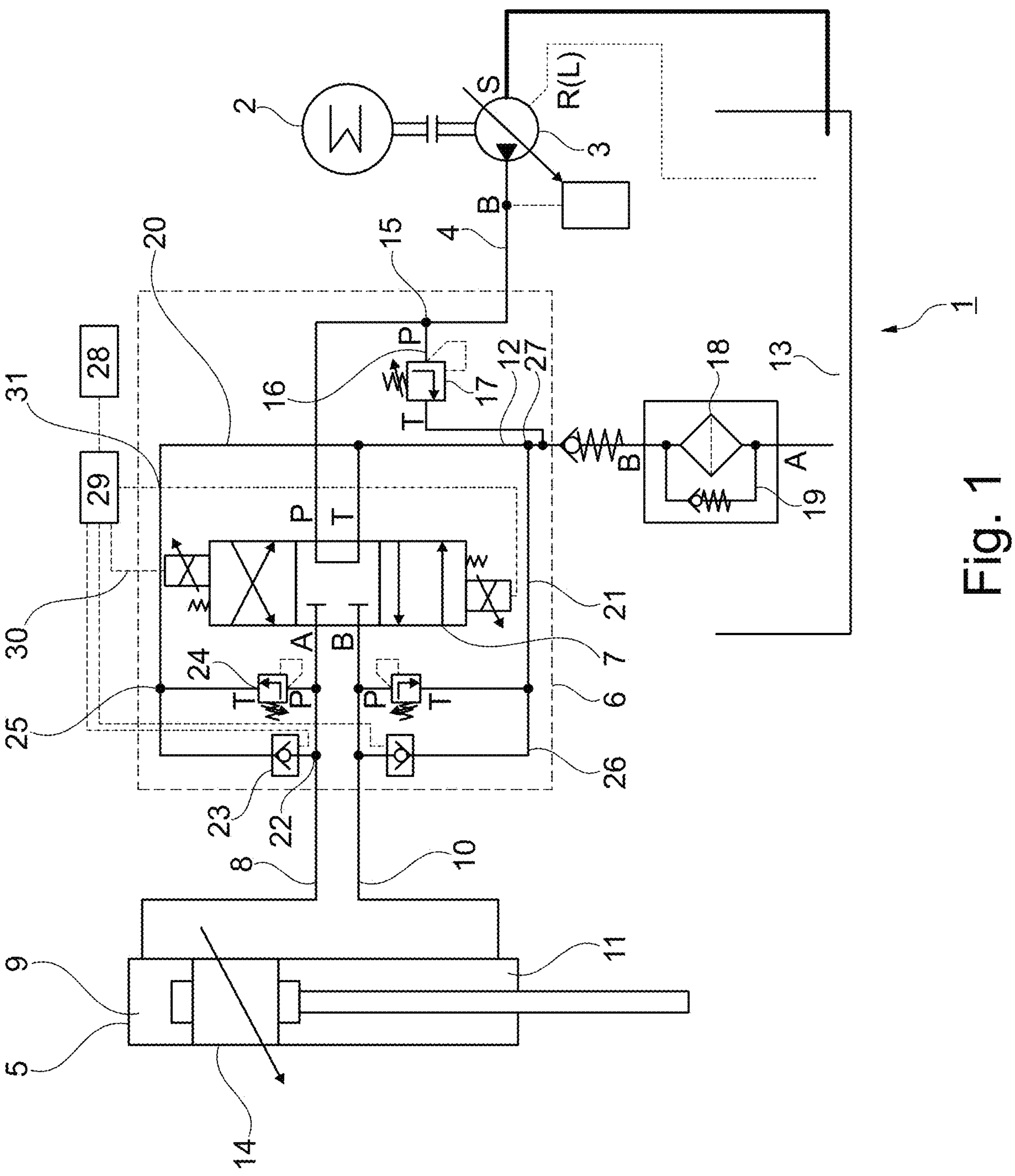
FIG. 1 shows a simplified schematic representation of an example embodiment of a hydraulic system of a mobile work machine with a hydraulic cylinder.
Figure 2:
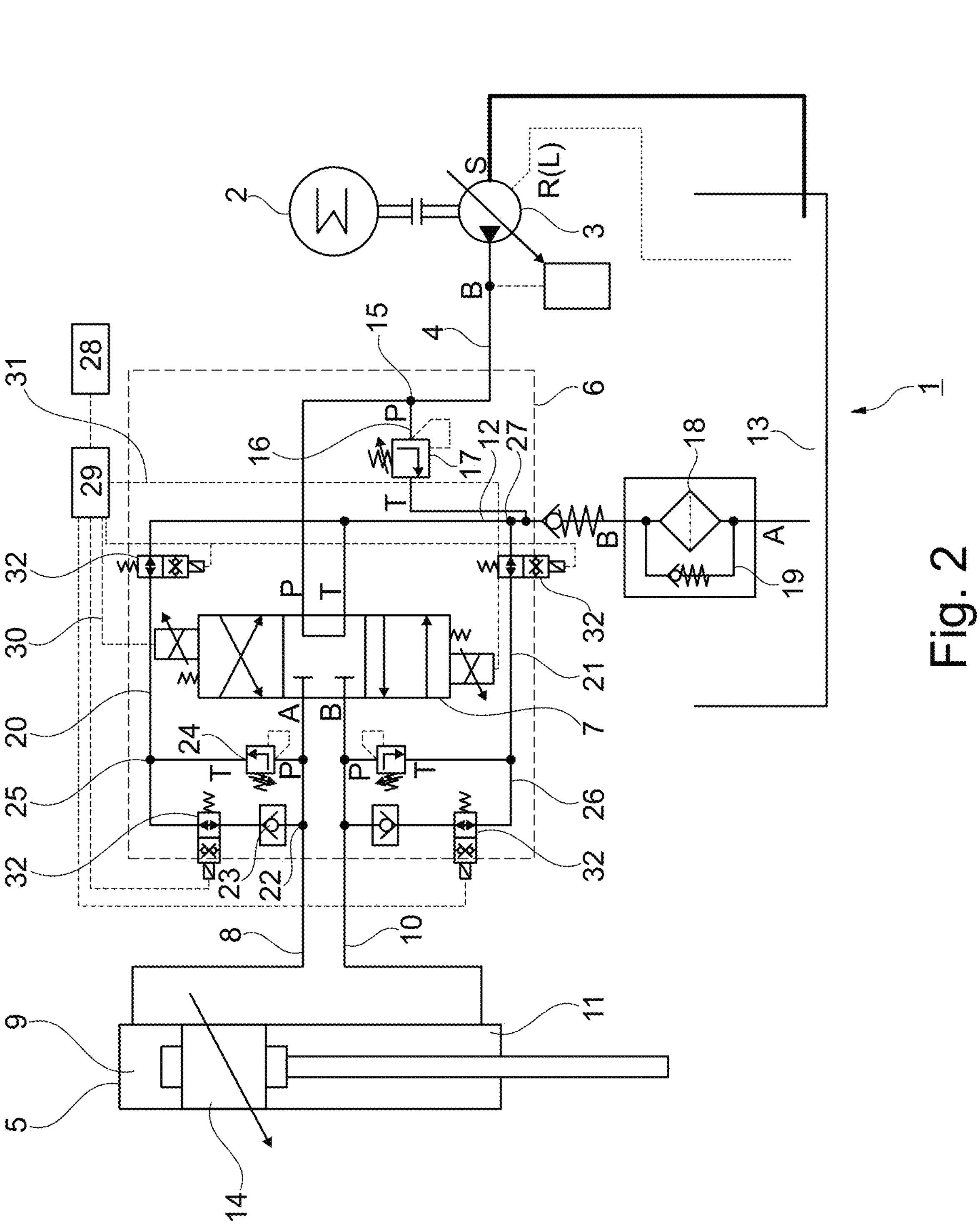
FIG. 2 shows further simplified schematic representation of an example embodiment of a hydraulic system of a mobile work machine with an additional emergency stop device.

FIGS. 1 and 2 show a hydraulic control circuit 1 of a mobile work machine. A pump 3 driven by a motor 2 pumps hydraulic fluid into a pressure line 4 to control a double-acting hydraulic cylinder 5. A control section 6 of the hydraulic control circuit is shown in simplified form. A volume control valve 7 is provided for the hydraulic control of the hydraulic cylinder 5, which preferably is a 4/3-way valve, in particular as a 4/3-way proportional valve, as shown. The volume control valve 7 has four connections A, B, P, T. A first connection A is connected to a first work line 8, which is connected to a first chamber 9 of the hydraulic cylinder 5. A second connection B is connected to a second work line 10, which is connected to the second chamber 11 of the hydraulic cylinder 5. The third connection P is connected to the pressure line 4 and the fourth connection T is connected to a tank line 12 (also called return line), which leads to the tank 13.

In a first extreme state of the volume control valve 7, the first connection A is connected to the connection P and the pressure line 4, while the second connection B is connected to the fourth connection T. In this case, hydraulic fluid can flow from the pressure line 4 into the first chamber 9 of the hydraulic cylinder 5, while the second chamber 11 is connected to tank 13 via connections B and T. In this way, a piston 14 of the hydraulic cylinder 5 is moved in a first direction. In the neutral position (second extreme state) of the volume control valve 7 shown, connections A and B are blinded, i.e., closed, and the pressure line 4 is connected to the tank line 12. The piston 14 of the hydraulic cylinder 5 then remains in its current position because there is no outflow or inflow. It is a blocking state. In the third extreme state of the volume control valve 7, connection P is connected to connection B and connection A is connected to connection T. In this case, hydraulic fluid flows from the pressure line 4 into the second chamber 11 of the cylinder 5 and the first chamber 9 is connected to the tank 13 via connection A and connection T. The hydraulic fluid then exerts a force on the piston 14 of the hydraulic cylinder 5 in such a way that it is displaced in a second direction opposite to the first direction. As already described, the volume control valve 7 is a proportional valve. The hydraulic fluid flow coming from the pressure line 4 is distributed between the chambers 9, 11 by varying the valve states between the three extreme states, so that it is possible to achieve a defined piston movement speed by controlling/regulating the volume flow.

Behind the outlet of the pump 3 and in front of the volume control valve 7, a branch 15 is provided in the pressure line 4, from which a line 16 branches off and leads to the tank 13 via a pressure relief valve 17 opening in the direction of the tank 13.

The tank line 12 leads to the tank via a return filter 18. Instead of the return filter shown, it is also conceivable to use a different filter with, for example, a different filter medium. The return filter 18 can be bypassed by a bypass 19 with a differential pressure valve 19 that opens in the direction of the tank 13. The return filter bypass pressure is in the range between about 0.5 and about 1.5 bar, for example. Between the return filter 18 and the branch to the pressure relief valve 17, an optional spring-loaded check valve is provided, which opens towards the tank 13 and generates a dynamic pressure in a range of about 3-8 bar, preferably about 5 bar, for example.

The volume control valve 7 includes two bypasses 20, 21. A first bypass 20 branches off from the tank line 12 between connection T and the branch with the pressure relief valve 17 and ends in a branch 22 of the first work line 8. A check valve 23 is provided in the first bypass 20. Parallel to the check valve 23, the bypass 20 includes a secondary pressure relief valve 24. The secondary pressure relief valve 24 is located in a line that branches off from the first work line 8 between connection A and the branch 22 of the first bypass 20 and ends in the first bypass 20 between the check valve 23 and the branch of the tank line in a branch 25. The check valve 23 functions as a so-called anti-cavitation valve connected to the tank 13. If a pressure in the first work line 8 is greater than a predetermined pressure, the check valve 23 closes. However, if the first work line 8 has lower pressure (in the example embodiment shown, the pressure in the first work line 8 is equal to or less than a predetermined pressure, which may be, for example, the dynamic pressure of the spring-loaded check valve or preload valve), the anti-cavitation valve opens and the first work line 8 or the first chamber 9 can replenish from the tank line 12 or the tank 13, thus preventing cavitation. If there is not enough volume flow available to supply the hydraulic cylinder, the suction valve still allows for trouble-free operation.

The second bypass 21 of the volume control valve is constructed analogously to the first bypass 20 and protects the second work line 10 or second chamber 11 against overload on the one hand and cavitation on the other. The bypass line 26 of the second bypass 21 is connected on the tank side to the tank line 12 in a branch 27 located between the branch to the pressure relief valve 17 and the branch to the first bypass.

It may also be provided that the anti-cavitation valve is generally connected to a return line (e.g., directly to the tank) of an open hydraulic circuit. The anti-cavitation valve and the secondary pressure relief valve may be combined in a cartridge. The pressure relief function and the replenishment function may be integrated together in a valve and thus be compact.

To control the volume control valve 7, an operating unit 28 designed as a joystick can be connected to a controller 29. The latter is in turn connected to the volume control valve 7 via signal lines 30 and 31.

The two work lines 8, 10 can be in the form of channels, pressure medium pipes, or flexible hoses. Flexible hoses are indispensable for movable hydraulic cylinders. If, during operation, as described in more detail above, a flexible hose becomes caught on a protruding reinforcing bar, for example, during the demolition of a building, and is torn off as a result, a large amount of hydraulic fluid would escape from the break point in conventional hydraulic systems.

In the event that the return hydraulic fluid flows through the return filter 18 with the return filter pressure before it reaches the tank 13, the filter back pressure always acts on the anti-cavitation valves 23 and opens them in the event of a leak in the associated work line, where hydraulic fluid is then immediately forced out (due to the aforementioned filter back pressure). If the optional spring-loaded check valve (general preload valve) is also present, the hydraulic fluid leakage from a defect in the aforementioned work line would be further exacerbated. In the event of a leak, in this case, hydraulic fluid would not be sucked back from the tank via the anti-cavitation valves, but rather a low (for example, about 3-10 l/min) standby delivery rate from a running but not control-command-regulated control pump or a constant pump would ensure a preload pressure in the bypass circuit (anti-cavitation circuit) and hydraulic fluid leakage. If a non-defective hydraulic circuit is now activated, the pump can regulate up to the maximum delivery rate, depending on the activation intensity. The return hydraulic fluid then escapes from the activated function at the described defect location in the work line when the anti-cavitation valves open, instead of taking the intended route via the preload valve through the return filter into the tank.

To prevent this, an example embodiment of the present invention may include an emergency stop device or emergency stop function which, in the event of an emergency, prevents hydraulic fluid from flowing in the affected work line toward the break point and also prevents hydraulic fluid from reaching the break point from the bypass bypassing the volume control valve and escaping from the leak in the working line.

FIG. 1 shows a first example embodiment of an emergency stop device. The check valve 23 is a controllable valve. The check valve 23 is configured such that, in the event of a hose rupture, it is moved from an open position to a closed position, regardless of whether an opening pressure is applied. The closing element can be moved into the closed position hydraulically, mechanically, electrically, or pneumatically.

If the refill function is not represented by a check valve, an example embodiment of the present invention provides that the valve representing the refill function or the valve arrangement representing the refill function is controlled, actuated, or moved accordingly in the event of damage in order to prevent hydraulic fluid flow through the bypass to the damaged work line.

In addition, in such an emergency, it must be ensured that the damaged work line between the break point and pressure line 4 is shut off or blocked. This is already the case if an operator of the mobile work machine no longer operates the controller 28 configured or programmed to control the hydraulic cylinder. The operator can be instructed to do this. To ensure that the damaged work line remains shut off even when the controller is actuated, the controller can be instructed not to transmit the actuation to the volume control valve. The controller can also be locked, for example. It is also conceivable to prevent the volume control valve from being activated or to prevent a change in status in some other way. It is also conceivable that, in an emergency, the volume control valve is automatically transferred to a state in which the damaged work line is blocked. It is also conceivable to close the work line via an additional valve or valve arrangement or a shut-off device, which is controlled, actuated, or moved accordingly in an emergency.

FIG. 2 shows a second example embodiment of an emergency stop device 32 with two different installation positions. Only one of the installation positions is used in each case. In the first installation position, the emergency stop device 32 is located in the bypass 20, 21 between the branch 25 to the secondary pressure relief valve 24 and the check valve 23. In an emergency, the emergency stop device 32 blocks the flow of hydraulic fluid through the tank line 12 to the damaged work line. The emergency stop device 32 can be an additional valve, a valve arrangement or even a shut-off device, such as a slide valve, ball valve or the like. A 2/2-way valve is shown as an emergency stop device 32, which is held in the open position in the neutral position (rest position) via a spring. It is an electrically or electronically controlled solenoid valve that can be controlled by the controller 29. In an emergency, the controller can switch the 2/2-way valve to a closed position and shut off the bypass 20, 21 connected to the tank line 12, preventing refilling. Due to its position, the pressure limiting function remains active even when the line is shut off by the emergency stop device 32.

In the second installation position, the emergency stop device 32 is located in the bypass 20, 21 between the branch from the tank line 12 and the branch 25 to the secondary pressure relief valve 24. If the replenishment function and pressure relief function are combined in a single device, the emergency stop device can be located in the bypass on either side of the device. In general, it is also conceivable that the emergency stop device is located somewhere in the bypass, regardless of how the replenishment function and pressure relief function are technically implemented. It is also conceivable that the emergency stop device is located outside the bypass, namely, in the tank line between the branch to the bypass and the return filter, in particular between the branch to the bypass and the branch to the pressure relief valve, since the pressure relief function is then still available. If the emergency stop device is located between the branch to the bypass near the filter and the branch to the pressure relief valve, the emergency stop device can shut off the replenishment of both anti-cavitation valves and stop the hydraulic fluid flow into both bypasses. This example embodiment can be particularly cost-effective. In this case, it is preferable for both bypass lines to have a single (common) connection to the tank line and the connection of the volume control valve to the tank line is located between the emergency stop device and the filter, with the branch of the pressure relief valve located in the line from the volume control valve to the tank. The junction of the two bypass lines is located on the side of the connection of the volume control valve to the tank line that is farthest from the filter. This ensures that the emergency stop device only shuts off the control section affected by a leak and that the remaining functions or control sections are still available.

Preferably, the first bypass and the second bypass, as well as the associated emergency stop devices, are configured to function in the same way. If one emergency stop function is provided per bypass, these can be identical. However, due to space constraints or other design limitations, it is also conceivable to provide the emergency stop devices or check valves with different emergency stop functions.

In general, it is also conceivable to use emergency stop devices or check valves with an emergency stop function that close automatically in the event of a leak in the work line and an associated drop in pressure. A sensor could also be considered that detects such a pressure drop and reports it to the controller, which then decides whether an emergency exists and whether appropriate measures need to be taken. It may also be useful for the operator of the mobile work machine to detect a fault, for example, via an emergency stop button, and pass the information on to the controller, which then takes the appropriate measures.

In addition, it may be advisable that, in the event of an emergency, the emergency stop devices or check valves with emergency stop function of a bypass close the bypass line, and that this also happens automatically for the other bypass of the same hydraulic cylinder.

It may be particularly preferable for the emergency stop devices or check valves with emergency stop function to be able to be returned to a neutral state without great effort. This may be, for example, by a shut-off device reopening the line or a valve or valve arrangement being returned to the neutral position without the need to replace components.

Figure 3:
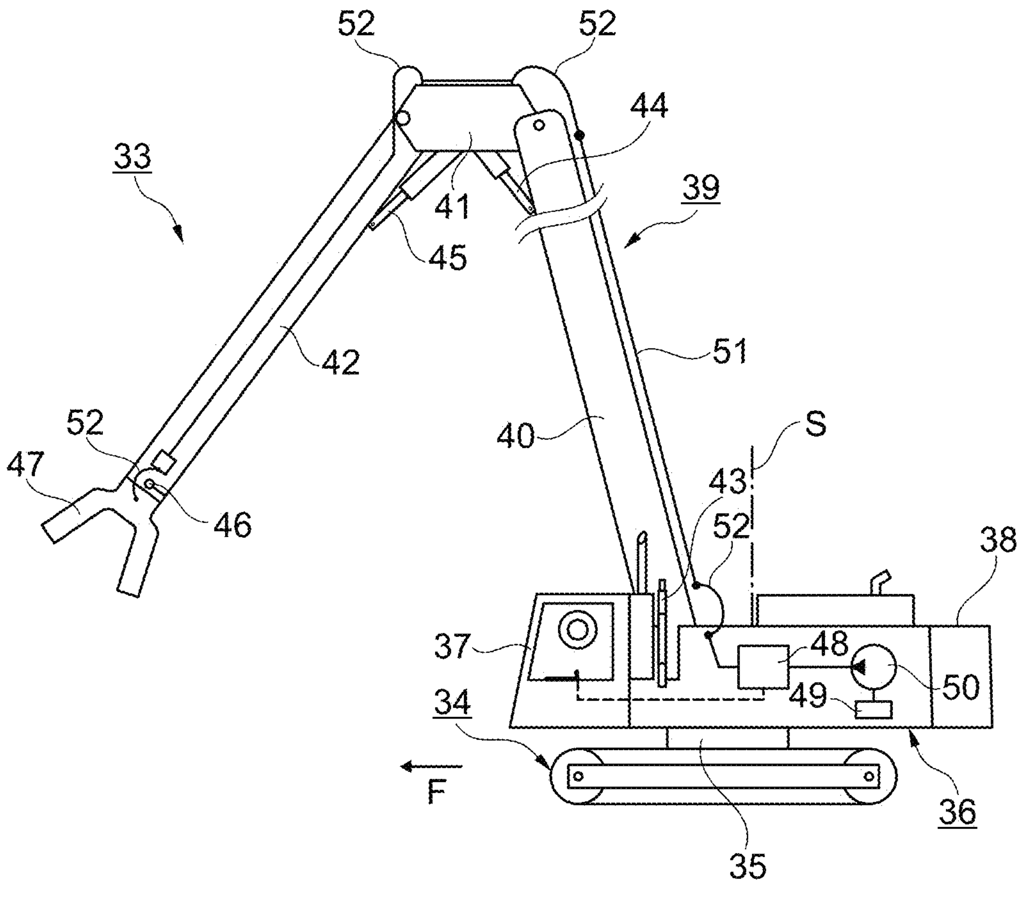
FIG. 3 shows a representation of an excavator.

FIG. 3 shows a mobile work machine 33 according to an example embodiment as an excavator, in particular, a long-arm excavator with a lower structure 34, which is connected to an upper structure 36 via a swivel mechanism 35 that can rotate about a swivel axis S. The swivel mechanism 35 enables a controlled swivel movement between the upper structure 36 and the lower structure 34 around the swivel axis S. In general, a distinction can be made between mobile excavators and crawler excavators. The lower structure 34 can have tires in a chassis, in which case it is referred to as a mobile excavator, whereby mobile excavators are only used in the weight class up to about 25 t, for example, or it can have tracks, in which case it is referred to as a crawler excavator, which may be used in all weight classes, for example. Mobile and crawler excavators are self-driven land vehicles and must be distinguished from other types of excavators, such as floating excavators. In the present example embodiment, the long-arm excavator is a crawler excavator, which is in a weight class typical for demolition work between about 25 t and about 400 t, for example. The upper structure 36 includes a driver's cabin 37 at its end in the direction of travel F (straight alignment) and a counterweight 38 opposite the driver's cabin 37. FIG. 3 shows a three-part boom assembly 39, which is attached to the upper structure 36 next to or behind the driver's cabin 37. The boom assembly 39 includes three links 40, 41, 42 arranged one behind the other. A first link 40, called the boom, a second link 41, called the intermediate boom, and a third link farthest from the upper structure, called the arm 42, wherein two successive links are pivotally mounted to each other via bolts. The boom assembly 39 further includes a boom cylinder 43, which can move the first link 40, and an intermediate boom cylinder 44, which can move the second link 41 of the boom assembly 39. Furthermore, an arm cylinder 45 is provided, which can be driven to move the arm 42. An attachment 47 is attached to the free end of the arm 42, which is penetrated by an arm head bolt 46. This connection can preferably be made by a quick coupler. The attachment 47 and the quick coupler can also be pivoted about the pivot axis defined by the arm head bolt 46. In this example embodiment, the attachment 47 is a gripping tool, but any hydraulic attachment, such as shears, can be used.

The mobile hydraulic construction machine includes a hydraulic system which, among other things, drives the boom cylinder 43 and the intermediate boom cylinder 44 as well as the arm cylinder 45 and, optionally, a hydraulic cylinder of an attachment 42 via hydraulic fluid. The hydraulic system includes at least one valve block 48, a hydraulic fluid tank 49, and a hydraulic pump 50, which are located in the upper structure 36 (also known as the upper carriage). The hydraulic pump 50 delivers the hydraulic fluid to the hydraulic system and is connected to the at least one valve block 48 via a hydraulic connection. Several pumps may be used in the hydraulic system if the output of one pump is not sufficient for the required application or if the system is to be designed redundantly. The at least one valve block 48 controls and regulates a hydraulic fluid flow to the aforementioned hydraulic cylinders. The work lines 51 lead from the at least one valve block 48 to the hydraulic cylinders.

FIG. 3 shows a simplified schematic representation of the hydraulic system. For example, only one work line 51 is shown, but depending on the attachment used and the type of construction machine, there may be several, but at least two hydraulic lines 51 per hydraulic cylinder. The type of attachment 47 and the movement it can perform define the number of hydraulic lines (used and connected). For example, the attachment may have hydraulic cylinders for performing movements such as opening and closing, or there may also be a hydraulic cylinder for moving the attachment relative to the arm, e.g., the bucket cylinder. The hydraulic cylinders may be single-acting or double-acting.

Depending on where they are located and where they lead to, the hydraulic lines may be defined by or include channels that are firmly attached to the upper side of the boom assembly or by flexible hose lines. In areas where movement must be allowed, the hose lines are provided in an arc shape, for example. These areas are called flexible hose bends 52 and differ from hose bends that are available as components and have a fixed, rigid geometry. The flexible hose bends 52 allow the individual links of the boom assembly 39 to pivot against each other without interrupting or tearing the hydraulic lines 51.

The control section with emergency stop device or emergency stop function described above can be used in the hydraulic system of the mobile work machine described above. The emergency stop device can be used for a work cylinder, for example that of the attachment, the arm, the boom, etc., or for a number of work cylinders or even for all work cylinders to protect against the escape of large quantities of hydraulic fluid in the event of a hose rupture. This makes it particularly easy and safe to prevent large quantities of hydraulic fluid from escaping and causing damage in the event of a leak in the work line. In addition, the other functions of the mobile work machine remain intact and the machine can be moved, for example, to repair the leak. This is particularly advantageous if the leak is located far away from the upper structure, for example in the area of the boom group, in particular the arm or bucket, and these cannot be reached by an operator when the leak occurs.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile work machine comprising:

a lower structure;

an upper structure;

a boom assembly; and a hydraulic system including:

a hydraulic pump;

a work line;

a hydraulic consumer;

a volume control valve to regulate hydraulic fluid flow in the work line and connected to the hydraulic consumer to control the hydraulic consumer; and a bypass to bypass the volume control valve; wherein an anti-cavitation device with a replenishment function is provided in the bypass such that when a pressure in the work line is greater than a predetermined pressure, the bypass is closed, and when the pressure in the work line is equal to or less than the predetermined pressure, the bypass is open, and the work line or the hydraulic consumer connected to the work line is configured to replenish hydraulic fluid via a supply line;

the anti-cavitation device includes an emergency stop function or device to close the bypass or the supply line when a leak is detected in the work line;

a pressure relief valve parallel to the anti-cavitation device is provided in the bypass, or the anti-cavitation device includes a pressure relief function; and an emergency stop device is located in the bypass between a branch from the work line and a branch connected to a line in which the pressure relief valve is provided.

2. The mobile work machine according to claim 1, wherein the hydraulic consumer includes a hydraulic cylinder to cause movement of at least one of the boom assembly or a hydraulic-fluid attachment.

3. The mobile work machine according to claim 1, wherein the bypass includes a branch from a tank line and the supply line is the tank line.

4. The mobile work machine according to claim 1, wherein the emergency stop device or the anti-cavitation device including an emergency stop function is switchable back and forth between a closed state and an open state.

5. The mobile work machine according to claim 1, wherein the anti-cavitation device including an emergency stop function includes a check valve to be closed at least one of manually, electrically, hydraulically, or pneumatically.

6. The mobile work machine according to claim 1, wherein a controller configured or programmed to control the volume control valve is connected to at least one of the emergency stop device or the anti-cavitation device to activate the at least one of the emergency stop device or the anti-cavitation device to close the line when a leak is detected in the work line.

7. The mobile work machine according to claim 1, wherein the hydraulic system includes at least one of a pressure sensor or a hydraulic circuit to detect a leak in the work line.

8. A method of using the mobile work machine according to claim 1, the method comprising:

when a leak is detected in the work line, shutting off the line in the bypass or the supply line to shut off a volume flow of hydraulic fluid in a direction of the work line.

9. A method for reducing or minimizing hydraulic fluid loss in a mobile work machine in response to a leak in a work line, the mobile work machine including: a lower structure; an upper structure; a boom assembly; and a hydraulic system including: a hydraulic pump; the work line; a hydraulic consumer; a volume control valve to regulate hydraulic fluid flow in the work line and connected to the hydraulic consumer to control the hydraulic consumer; and a bypass to bypass the volume control valve; wherein an anti-cavitation device with a replenishment function is provided in the bypass such that when a pressure in the work line is greater than a predetermined pressure, the bypass is closed, and when the pressure in the work line is equal to or less than the predetermined pressure, the bypass is open, and the work line or the hydraulic consumer connected to the work line is configured to replenish hydraulic fluid via a supply line; and the anti-cavitation device includes an emergency stop function or device to close the bypass or the supply line when a leak is detected in the work line, the method comprising:

at least one of moving or holding at least one of the volume control valve in a shut-off position to shut off the work line to a pressure line connected to the hydraulic pump; and shutting off the bypass or the supply line to prevent the hydraulic fluid from entering the work line via the bypass.

10. The method according to claim 9, further comprising:

after the leak has been repaired, releasing the volume control valve and opening the bypass or the supply line so that the hydraulic fluid is able to enter the work line via the bypass when there is a certain pressure in the work line.

11. The method according to claim 9, further comprising:

closing a second bypass to bypass the volume control valve; wherein an anti-cavitation device with a replenishment function is provided in the second bypass such that when a pressure in a second work line associated with the hydraulic consumer is greater than a predetermined pressure, the second bypass is closed, and when the pressure in the second work line is equal to or less than the predetermined pressure, the second bypass is open and the second work line or the hydraulic consumer connected to the second work line is able to suck in the hydraulic fluid via the supply line; or shut off the supply line such that the shut-off is also performed when the second work line is leak-free in order to prevent the hydraulic fluid from escaping from the work line.

* * * * *